April 1, 1958     A. J. FROMBERG     2,828,791
PLUG
Filed Jan. 29, 1957
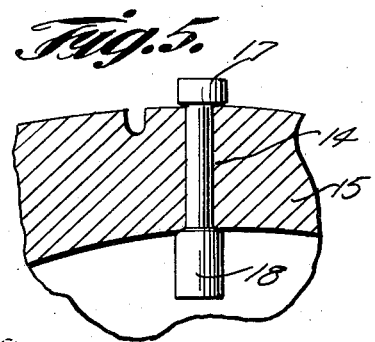
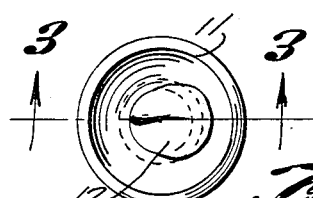
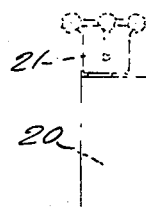
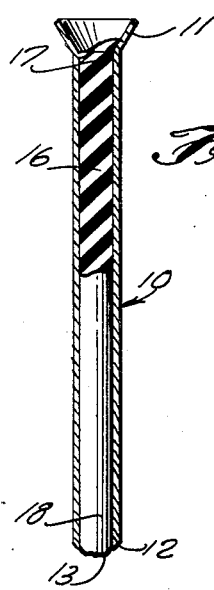
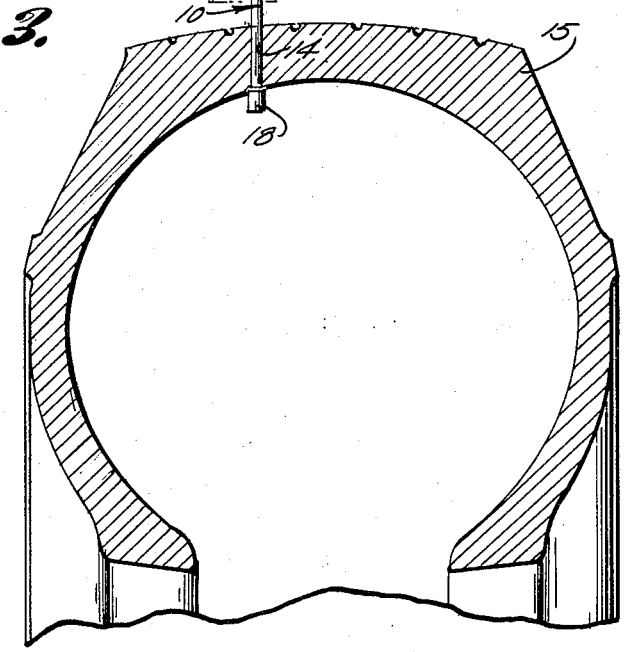
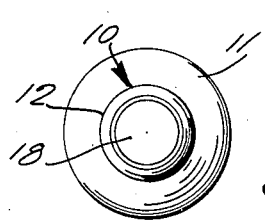
INVENTOR.
Aaron J. Fromberg
BY Victor J. Evans & Co.
ATTORNEYS

United States Patent Office 2,828,791
Patented Apr. 1, 1958

2,828,791
PLUG

Aaron J. Fromberg, Gormon, Calif.

Application January 29, 1957, Serial No. 636,941

3 Claims. (Cl. 152—370)

This invention relates to repair plugs for tubeless tires, and in particular a tube of relatively thin stiff or rigid material, such as metal having an outwardly flared flange on one end and filled with a cylindrical element of rubber or other resilient material with the rubber element being in a contracted state in the shell or tube and having enlarged portions at the ends.

The purpose of this invention is to provide a plug adapted to be inserted in an opening, such as a nail hole in a motor vehicle tire wherein after the tubular shell is withdrawn a stem of the plug is retained in the tire by an enlarged head on the inner end and wherein upon removal of the shell a corresponding enlarged head is provided on the outer end with the intermediate part of the plug or stem remaining in the tire.

This application is a continuation in part of my co-pending application filed September 30, 1955, with the Serial No. 537,636, the original application being restricted to an applicator for applying the plug to a tire and this application including only the plug comprising a thin tubular shell with a plug of rubber or other elastic material compressed therein.

Various types of devices have been provided for inserting stems of elastic sealing material in openings in tires, particularly of the type used for repairing bicycle tires, however, with substantially all devices for this purpose it is necessary to operate from both sides of the tire or force a flat rubber disc through the opening and pulling a stem extended therefrom back through the opening with a string. Although such devices have been used satisfactorily for bicycle tires it is substantially impossible to force such stems or plugs through relatively heavy motor vehicle tires.

With this thought in mind this invention contemplates a plug including the combination of a thin shell with an outwardly flared flange on one end and a stem of resilient material compressed in the shell and having an enlargement at least on one end whereby upon forcing the stem from the shell with the plug extended through an opening in the tire the enlarged end expands providing means for preventing the elastic stem being withdrawn with the shell.

The object of this invention is, therefore, to provide means for installing a stem of resilient material in an opening through a motor vehicle tire with the stem extended through the opening in the tire in which the stem is inserted by a rigid member and in which means is provided for preventing the stem being withdrawn with said rigid member.

Another object of the invention is to provide a plug for repairing tubeless tires in which a filling element is permanently mounted in the tire from the outside of the tire.

A further object of the invention is to provide a plug for repairing tubeless tires without removing the tire from a wheel or rim thereof in which the plug is of a simple and economical construction.

With these and other objects and advantages in view the invention embodies an elongated tubular shell having an outwardly flared flange extended from one end and in which the material of the wall thereof, at the opposite end is curved in to the inner edge providing a sharp annular edge, and a plug of resilient material compressed in the shell and having portions at the ends formed to expand to a greater extent than the intermediate portion of the stem.

Other features and advantages of the invention will appear from the following description taken in connection with the drawing, wherein:

Figure 1 is a view showing a cross section through a motor vehicle tire with the plug inserted through an opening in the tire and with the tubular shell withdrawn whereby the inner end is flush with the inner surface of the tire, and also showing, in broken lines, an applicator for inserting the plug and removing the shell.

Figure 2 is a plan view of the plug with the parts shown on an enlarged scale.

Figure 3 is a longitudinal section through the plug taken on line 3—3 of Fig. 2 with the lower part of the stem of elastic material shown in elevation.

Figure 4 is a view looking upwardly toward the lower end of the plug shown in Fig. 3 with the parts shown on an enlarged scale.

Figure 5 is a longitudinal section through a portion of a motor vehicle tire showing the finished plug in an opening extended through the tire with the applicator and tubular shell removed.

Referring now to the drawing wherein like reference characters denote corresponding parts the improved motor vehicle tire repair plug of this invention includes an elongated tubular shell 10 having an outwardly flared flange 11 on one end and having an arcuate surface 12 blending the outer surface of the shell to a sharp inner edge 13 to facilitate forcing the shell into a comparatively small opening 14 in a motor vehicle tire 15, and a stem 16 of rubber or other suitable elastic material compressed in the shell 10 and having enlarged end portions 17 and 18 which, upon being released expand to a greater extent than the intermediate portion of the stem whereby, the head or enlarged portion 18 on the inner end of the stem, in particular, expands, providing means for retaining the plug in the tire as the tubular shell 10 is withdrawn, the intermediate portion of the stem 16 being retained in a contracted position by the surrounding material of the tire 15.

In use the head or flange 11 of the plug is gripped in a carrier 19 of an applicator 20, shown in broken lines in Fig. 1 and with the stem in the tubular shell 10, as shown in Fig. 3, the shell is forced through the opening 14 and upon rotation of a knob 21 at the upper end of the applicator the plunger of the applicator passes downwardly through the tubular shell as the shell is drawn outwardly through the opening 14, preventing the stem following the shell whereby the stem is extruded from the shell and, being compressed within the shell the stem expands, as indicated by the end portion 18, illustrated in Fig. 1.

The operation of the applicator is continued whereby the shell is completely withdrawn leaving the enlarged portions 17 and 18 on opposite sides of the tire and, for better performance, the end 17 is not removed but is permitted to wear down as the tire is used.

Before inserting the plug in the tire rubber cement is injected through the opening whereby the stem of the plug is permanently secured in position in the tire.

It will be understood that modifications, within the scope of the appended claims, may be made in the design and arrangement of the parts without departing from the spirit of the invention.

What is claimed is:

1. In a repair plug for tubeless tires, the combination which comprises an elongated tube of rigid material and of sufficient length to extend through the tread and carcass of a tubeless tire, and a cylindrical element of resilient material positioned in the tube, said tube having an outwardly flared portion at one end to facilitate inserting the cylindrical element therein and said cylindrical element being in the contracted state in the tube wherein after removal of the tube the cylindrical element expands frictionally engaging the cylindrical wall of an opening through the tread and carcass of a tubeless tire.

2. In a repair plug for tubeless tires, the combination which comprises an elongated tube of rigid material and of sufficient length to extend through the tread and carcass of a tubeless tire, and a cylindrical element of resilient material positioned in the tube, said tube having a beveled outer surface on one end to facilitate inserting the tube through the tread and carcass of a tubeless tire and an outwardly flared portion at the opposite end to facilitate inserting the cylindrical element in the tube and said cylindrical element being in the contracted state in the tube wherein after removal of the tube the cylindrical element expands frictionally engaging the cylindrical wall of an opening through the tread and carcass of a tubeless tire.

3. In a repair plug for tubeless tires, the combination which comprises an elongated tube of rigid material and of sufficient length to extend through the tread and carcass of a tubeless tire, and a cylindrical element of resilient material positioned in the tube, said tube having a beveled outer surface on one end to facilitate inserting the tube through the tread and carcass of a tubeless tire and an outwardly flared portion at the opposite end to facilitate inserting the cylindrical element in the tube and said cylindrical element being in the contracted state in the tube wherein after removal of the tube the cylindrical element expands frictionally engaging the cylindrical wall of an opening through the tread and carcass of a tubeless tire, the ends of said cylindrical element being contracted to a greater extent than the intermediate portion thereof whereby upon removal of the tube the ends of the cylindrical element extended beyond the tread and carcass on both the inside and outside of the tire expand to a greater extent than the intermediate part of the cylindrical element extended through the tread and carcass of the tire.

References Cited in the file of this patent
UNITED STATES PATENTS

| | | |
|---|---|---|
| 496,359 | Hamman | Apr. 25, 1893 |
| 725,171 | Sutton | Apr. 14, 1903 |
| 1,545,831 | Hirst | July 14, 1925 |
| 1,897,028 | Anderson | Feb. 14, 1933 |
| 2,612,930 | Hawkinson | Oct. 7, 1952 |